July 27, 1954
J. G. SISKAVITCH
2,684,763
OIL FILTER CARTRIDGE
Filed June 8, 1951
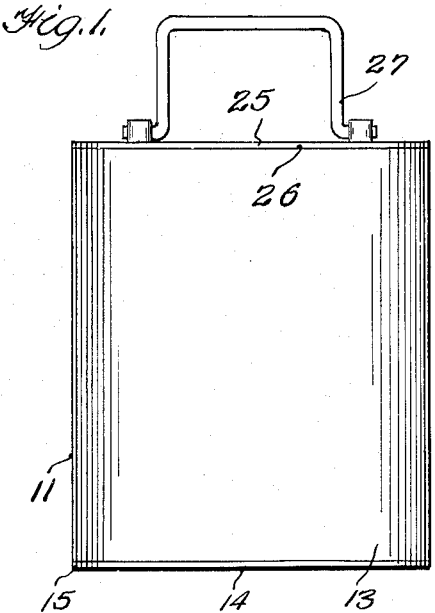
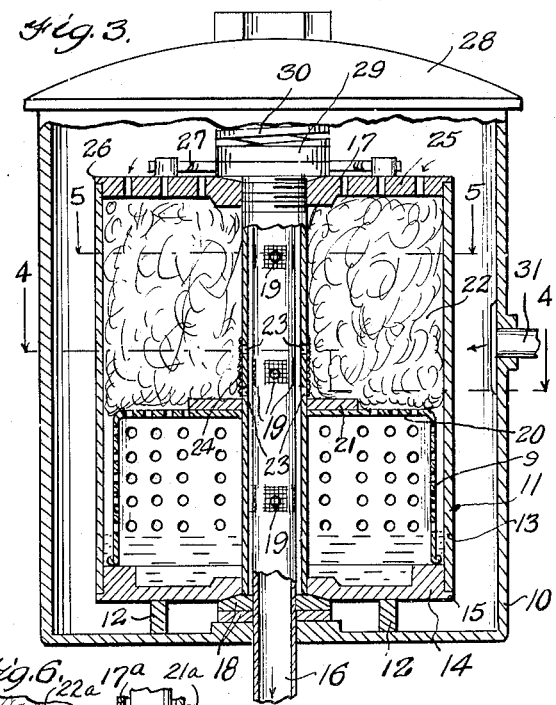
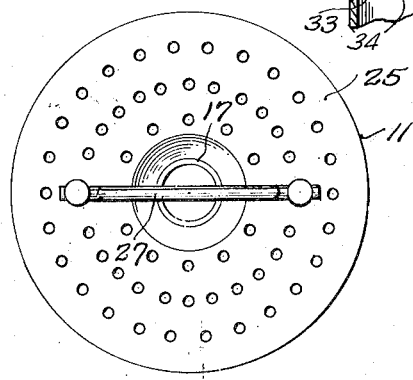
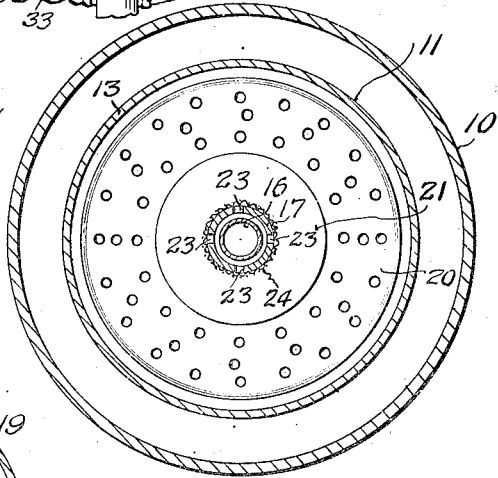
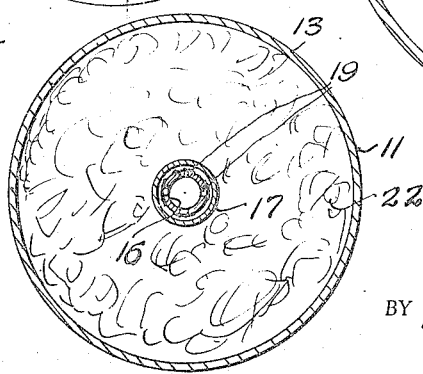
INVENTOR
JOHN G. SISKAVITCH
BY
HIS ATTORNEY Patented July 27, 1954

2,684,763

UNITED STATES PATENT OFFICE 2,684,763

OIL FILTER CARTRIDGE

John G. Siskavitch, Kingston, Pa.

Application June 8, 1951, Serial No. 230,471

2 Claims. (Cl. 210—148)

This invention relates to a removable oil filter cartridge which is especially adapted for use with oil filters, and has for one of its objects the production of a simple and efficient rechargeable and removable oil filter cartridge which is so constructed as to trap water and other impurities in the bottom of the cartridge and to feed the filtered oil to a selected point of use.

A further object of this invention is the production of a simple and efficient oil filter cartridge having a perforated cage at the bottom thereof which supports the fibrous filtering material and provides a trap to receive water, dirt and sludge which gravitate to the bottom of the filter through the fibrous filtering material.

Other objects and advantages of the present invention will appear throughout the following specification and claims.

In the drawing:

Figure 1 is a side elevational view of the cartridge;

Figure 2 is a top plan view thereof;

Figure 3 is a vertical sectional view through a filter and cartridge carried therein, certain parts being shown in section;

Figure 4 is a horizontal sectional view taken on line 4—4 of Figure 3;

Figure 5 is a horizontal sectional view through the cartridge taken on line 5—5 of Figure 3;

Figure 6 is a fragmentary vertical sectional view of a modified form of the invention, wherein the inverted perforated cup-shaped cage is replaced by a perforated filtering material supporting plate.

By referring to the drawing in detail, it will be seen that 10 designates a filter container or housing. A removable filter cartridge 11 is carried within the housing or container 10, as shown in Figure 1, and preferably rests upon the supports 12 which are carried in the bottom of the container or housing 10.

The cartridge 11 comprises a casing 13 which preferably is cylindrical and is open at both ends. A bottom plate 14 closes the lower end of the casing 13 and is detachable from the casing to facilitate replacement, cleaning and assembly of parts. The plate 14 preferably fits into the casing and is provided with a casing supporting flange 15 which abuts the bottom end of the casing and extends flush with the outer face of the casing 13 as shown in Figure 3. An oil outlet pipe 16 extends vertically through the housing 10 and through the hollow vertically extending tubular member 17 which is fixed to the bottom plate 14. Suitable supporting washers 18 are carried by the pipe 16 and support the plate 14 and tubular member 17 of the cartridge 11 in addition to the supports 12. The outlet pipe 16 is provided with apertures 19 which are preferably screened in the conventional manner as shown, and the pipe 16 is spaced from the interior of the tubular member 17, as shown in Figure 3.

An inverted cup-shaped perforated cage 20 having a straight side wall 9 rests upon the bottom plate 14 within the bottom of the casing 13 and the side wall thereof is spaced from the inner face of the casing 13, as shown in Figure 3 to permit a free passage of liquid through the side wall 9, and between the side wall 9 and the inner face of the casing 13. The cage 20 is preferably slightly less than one-half of the heighth of the casing 13. A retaining washer 21 surrounds the tubular member 17 and rests upon the top of the cage 20. The space within the casing 13 above the cage 20 is filled with cotton waste filtering material 22, or rags, paper, or other fibrous waste material may be used when desired. This material 22 does not extend between the wall 9 and the inner face of the casing 13, thereby defining an unobstructed area therebetween, with the filtering material 22 being located only above the cage 20. The space between the wall 9 and the inner face of the casing 13 is relatively narrow, as shown in Figure 3, thereby defining a relatively narrow passage therebetween, and since the filtering material such as cotton waste defined, becomes loosely matted together when saturated with oil, the waste material 22 will not enter the space between the walls 9 and 13 but will remain in the position shown. The tubular member 17 is provided with a plurality of apertures 23 which are located above the cage 20 and washer 21. A suitable shielding screen 24 covers these apertures 23, as shown in Figures 3 and 4.

A perforated removable cover plate 25 is preferably threaded upon the upper end of the tubular member 17 and fits into the upper end of the casing 13 to retain the fibrous filtering material 22 firmly in place therein, and also in contact with the top of the cage 20. The plate 25 is provided with an abutment flange 26 which overhangs the top end of the casing 13, and the flange 26 extends flush with the outer cylindrical face of the casing 13, as shown in Figure 3.

A hinged bail 27 is carried by the cover plate 25 to facilitate the threading and unthreading of the plate upon the tubular member 17. The bail 27 also will facilitate the handling of the cartridge 11. A cover or lid 28 closes the upper end of the housing 10 and the cover plate 25 abuts the retaining washers 29 which are in turn engaged by the spring 30 of the lid 28 to retain the cartridge 11 in position within the housing 10.

It should be noted that the present invention is directed to the construction of the cartridge itself and not to the filter housing, since the cartridge may be used with filter housings of various types.

As shown in Figure 6, a perforated disc-like filtering material supporting plate 34 may replace the cage 20 which plate 34 rests upon an annular collar 32 carried by the central tubular member 17ª. A retaining washer 21ª surrounds the member 17ª and rests upon the perforated plate 34. Supporting screws 33 extend through the side wall of the casing 13ª to support the edge of the plate 34. Suitable filtering material 22ª is supported upon the plate 34 in a manner similar to that shown in Figure 3. In the form shown in Figure 6, the plate 34 is preferably supported at a distance from the bottom of the cartridge equivalent to the top of the cage 20, shown in Figure 3.

It should be further noted that the cartridge may be readily assembled and disassembled for refilling or replacement, is easily handled, and provides a maximum area to receive water, sludge, dirt and the like in the bottom of the cartridge to insure the passage of filtered oil downwardly through the pipe 16. The oil to be filtered enters the housing at 31, passes through the top perforated plate 25, down through the filtering material 22 and the water, dirt, sludge and other impurities drain off by gravity into the inverted perforated cup-like cage 20 in the bottom of the casing 13. The filtered oil will pass through the apertures 23 into the hollow tubular member 17 and then out through the screened apertures 19 down through the pipe 16. Heavy particles and water will seek a lower level than that of the oil to accomplish a proper separation. When the cartridge has been used for a selected period it may be replaced, or taken apart and cleaned, and the filtering material 22 may be renewed.

Certain detail changes in the mechanical structure may be made without departing from the spirit of the invention, so long as such changes fall within the scope of the appended claims.

Having described the invention, what I claim as new is:

1. An oil filter cartridge comprising a hollow casing having an inner face, a bottom plate abutting and closing one end of said casing, a perforated inverted cup-like cage having a flat top and a vertical straight side wall supported upon said bottom plate and extending upwardly into said casing to define a trap area of material size within said cage for receiving water, sludge, dirt and the like which settle from oil passing through said cartridge, said side wall of said cage being spaced from the inner face of said casing and defining a relatively narrow passage therebetween, a fibrous filtering material which becomes loosely matted together when saturated with oil supported upon said flat top within said casing only upon and above said inverted cup-like cage thereby defining an unobstructed area between said side wall of said cage and the inner face of said casing, a central hollow tubular member carried by said bottom plate and extending vertically of and centrally of said casing, and a top perforated plate removably and adjustably mounted upon the upper end of said tubular member and engaging said fibrous filtering material for compressing and retaining said filtering material within said casing.

2. An oil filter cartridge comprising a hollow casing having an inner face, a bottom plate abutting and closing one end of said casing, a perforated inverted cup-like cage having a flat top and a vertical straight side wall supported upon said bottom plate and extending upwardly into said casing to define a trap area of material size within said cage for receiving water, sludge, dirt and the like which settle from oil passing through said cartridge, said side wall of said cage being spaced from the inner face of said casing, a fibrous filtering material which becomes loosely matted together when saturated with oil supported upon said flat top within said casing only upon and above said inverted cup-like cage thereby defining an unobstructed relatively narrow passage area between said side wall of said cage and the inner face of said casing, a central hollow tubular member carried by said bottom plate and extending vertically of and centrally of said casing, a top perforated plate removably and adjustably mounted upon the upper end of said tubular member and engaging said fibrous filtering material for compressing and holding the fibrous filtering material in loosely matted form within said casing, said top plate overhanging and abutting the upper end of said casing, the top and bottom plates and tubular member constituting means for holding the casing and contents thereof in rigid assembled relation, said tubular member having screened apertures formed therein for draining filtered oil from the interior of said casing downwardly through the tubular member, a bail carried by said top plate to facilitate the attachment thereof with said tubular member, a drain pipe fitted in said tubular member, and said drain pipe having screened drain apertures to convey oil from the interior of the tubular member into the interior of said drain pipe.

References Cited in the file of this patent

UNITED STATES PATENTS

| Number | Name | Date |
|---|---|---|
| 2,028,520 | Phillips | Jan. 21, 1936 |
| 2,168,125 | Hurn | Aug. 1, 1939 |
| 2,343,636 | Bentley | Mar. 7, 1944 |
| 2,463,929 | West | Mar. 8, 1949 |
| 2,586,226 | Heldenbrand | Feb. 19, 1952 |

FOREIGN PATENTS

| Number | Country | Date |
|---|---|---|
| 235,812 | Great Britain | June 25, 1925 |
| 263,017 | Great Britain | Dec. 23, 1926 |